March 26, 1935.  J. K. ELDERKIN  1,995,502
CONTROL FOR PROJECTION ARCS
Filed July 21, 1933
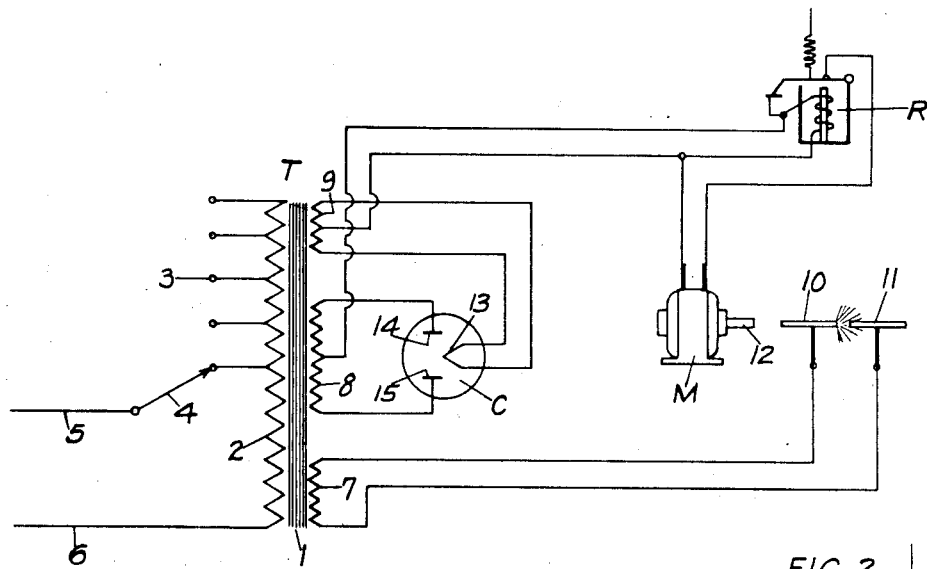
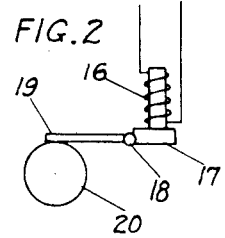
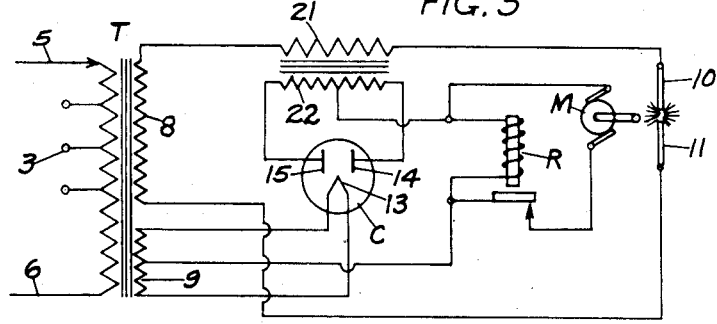
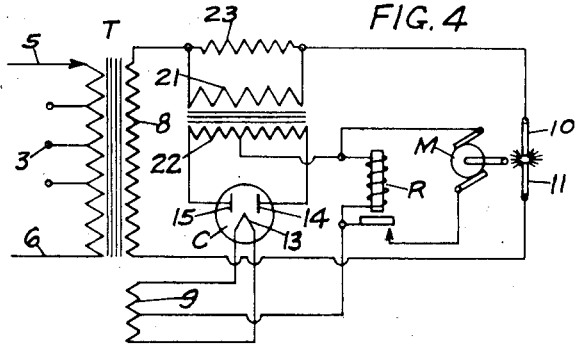
INVENTOR
JAMES K. ELDERKIN
BY
A. D. T. Libby
ATTORNEY Patented Mar. 26, 1935

1,995,502

UNITED STATES PATENT OFFICE 1,995,502

CONTROL FOR PROJECTION ARCS

James Knox Elderkin, Montclair, N. J.

Application July 21, 1933, Serial No. 681,481

10 Claims. (Cl. 176—53)

This invention relates to the use of alternating current in arcs for the projection of light for purposes, such as flood-lighting, stage effects, motion pictures, still pictures, slides, or for any other purpose where projected light is required.

In the early days of the moving picture business, alternating current was used almost entirely for the operation of projection lamps, but many operating objections were found with this type of lamp, the main one probably being the difficulty of regulating the length of the arc; so that the alternating current projector was replaced by the low-intensity direct current lamp, and in the last few years, the direct current reflector type of carbon arc lamp has even largely replaced, for certain classes of work, for example in the motion picture theatres, the older types of direct current lamps which superseded the very early alternating current projecting arc lamps. One of the reasons for the superseding of the earlier forms of alternating current projecting arcs by the direct current, was the accurate and more easy control of the arc length by the direct current mechanism.

The use of direct current for projector arcs, nevertheless, introduced certain additional operating expenses, for the reason that the source of current in most homes and in the outlying city districts, wherein many moving picture theatres are located, is alternating current, and this must be converted by means of motor generator sets, rectifiers, or some other suitable type of converter in order to get direct current for operating the lamps. Since practically all of the power used is consumed in the arc itself, a material saving in power can be made if the losses in the conversion from alternating current to direct current can be eliminated, at least for the power used at the arc.

However, recently, special carbons have been developed by the carbon manufacturers whereby a great many of the operating objections of alternating current have been overcome. Yet to get the highest efficiency from even these newly developed carbons, I have found it necessary to use control apparatus operated by direct current, for this new carbon requires an arc-feeding mechanism which must be extremely accurate and control the arc length to a very definite distance. I have found that A. C. arc-control feed mechanisms will not give this highly sensitive adjustment necessary to the successful operation of these carbons, and it is therefore one of the principal objects of my invention to produce a system or control for projection arcs in which alternating current is used at the arc, but in which all the advantages of the direct current control of the arc are still retained.

It is one of the objects of my invention to be able to use these new carbons in the present direct current operating arc lamps by applying alternating current thereto, but retaining, unchanged in the lamps, the direct current relay and motor and associated mechanism, which is not operable on alternating current.

In order to attain the objects of my invention, I provide a special supply transformer with a suitable type of rectifier for delivering direct current to the arc control apparatus, while at the same time this transformer delivers alternating current directly to the arc carbons.

My invention will be readily understood by reference to the annexed drawing, wherein:

Figure 1 is a diagrammatic view of my proposed system of operation.

Figure 2 illustrates, diagrammatically, a detail to be later described.

Figure 3 shows a modified form of control system.

Figure 4 shows a still further modified form of carrying my invention into practice.

In Figure 1, I have provided a transformer T having a core 1 on which is wound a primary winding 2 having a plurality of taps 3 which may be connected through a switch 4 to one of the line wires 5, the other end of the primary of the transformer being connected to the line wire 6.

The transformer T is provided with a plurality of secondary windings 7, 8, and 9. The winding 7 is connected to the arc electrodes 10 and 11. The arc is controlled by the motor M, the shaft 12 of which is connected to the usual gearing mechanism which forms no part of the present invention and which, for the sake of clarity, is not shown herein. The motor M is controlled by a relay R connected to the central points of the windings 8 and 9 which are in turn connected to a double-acting rectifier or converter C which, as shown, includes a filament 13 and plates 14 and 15.

The transformer T is preferably of a closed-core type, but of a design which is highly reactive, and the windings 7 and 8 are so disposed and arranged on the core that, as the arc gap between the electrodes 10 and 11 increases, causing the arc to draw less current, this lower current through the winding 7 reacts on the winding 8 so as to increase the potential therein, sufficiently to operate the relay R which is shown in closed position, thus completing a circuit through the motor M which, through its connecting mechanism, feeds the carbons to close the gap until normal current is drawn at the arc, and when this arc current becomes normal, the voltage in the winding 8 decreases and the relay R opens, thereby stopping the motor M.

While I prefer to use a small direct current motor for feeding the carbons as above described, the motor may be of some other type, as a mechanical clock arrangement, which, if used, is preferably provided with a relay 16 having an armature 17 pivoted at 18 and having brake arm 19 acting on brake disc 20 carried by the mechanical motor.

In Figure 3, I have shown a transformer T somewhat similar to that shown in Figure 1, but in which the winding 8 supplies the rectifier plates 14 and 15 with current indirectly through an auxiliary transformer having a primary winding 21 connected in series with the arc electrodes 10 and 11. The secondary 22 of the auxiliary transformer is connected to the converter electrodes 14 and 15, the other connections being somewhat similar to the corresponding connections in Figure 1.

The method of operation of the system shown in Figure 3, is, however, different from that shown in Figure 1. As the current through the arc electrodes 10 and 11 decreases, as by reason of the carbons burning apart, the voltage in the secondary winding 22 decreases so that the relay R will be de-energized sufficiently to close the back contact indicated, thereby completing a circuit through the motor M, or an equivalent control relay for a mechanical motor as in Figure 2. The motor will then move the arc carbons to bring them closer together and the current in the arc will then become normal, and the voltage in the secondary winding 22 will increase sufficiently to cause the relay R to open the motor circuit. In this system of control, the necessary reactance may be all in the winding 21, and the transformer T may have little reactance, or vice versa.

In the system of control shown in Figure 4, an impedance, preferably in the form of a resistance 23, may be utilized and the auxiliary transformer and primary winding 21 connected directly across this impedance. The method of operation, however, is generally similar to that shown in Figure 3.

From what has been said, it will be clear that I have provided ways and means of obtaining the objects of my invention which can not only be utilized in new equipment or lamp projectors, but can be readily applied to lamp projectors now in use, at relatively small expense.

Having thus described my invention, what I claim is:

1. In a projection arc apparatus, utilizing alternating current at the arc electrodes, means for supplying said current to, and controlling said arc, including a transformer having a core with windings thereon, the core and windings being so disposed that the transformer has considerable reactance, a direct current motor for relatively moving said arc electrodes, a direct current relay for operating said motor, a rectifier connected to certain of said windings on said transformer and for converting the alternating current to direct current for the relay and motor circuits connected through the rectifier, one of the transformer windings being connected to the arc electrode and associated with the rectifier winding, whereby the variations in the arc current from its transformer winding will react on said transformer rectifier winding to cause the relay and motor to function as and for the purposes described.

2. In a projection arc apparatus, utilizing alternating current at the arc electrodes, means for supplying said current to, and controlling said arc, including a transformer having a core with windings thereon, the core and windings being so related that the transformer has considerable reactance, a direct current relay, a motor for relatively moving said arc electrodes and controlled by said relay, a converter connected to a part of the transformer windings for delivering direct current to said relay, a part of said windings being connected to the arc electrodes, said last-mentioned winding being arranged and disposed, with respect to the core and said converter winding, so that the variation in the arc current through its supply winding will cause the relay to function and hence the motor, as and for the purposes described.

3. For a projection arc apparatus, means for utilizing alternating current at the arc electrodes but controlling the arc with direct current including, a transformer having a primary winding and a plurality of secondary windings, one of said secondary windings being connected across the arc electrodes, a rectifier, at least another of said secondary windings being connected to the rectifying elements of said rectifier, a direct current relay having an operating winding in the rectifier output circuit, and a motor, for regulating the arc gap, controlled by said relay, the variations in the arc current acting through its transformer winding onto the winding connected to the rectifier so as to operate said relay as described.

4. For a projection arc apparatus, means for utilizing alternating current at the arc electrodes but controlling the arc with direct current including, a transformer having a primary winding and a plurality of secondary windings, one of said secondary windings being connected across the arc electrodes, a double-wave rectifier, a secondary winding connected to opposed rectifying elements of the rectifier, another winding on the transformer connected to the control element of the rectifier, a direct current relay connected to the central points and said last two mentioned transformer windings, and a motor, for regulating the arc gap, controlled by said relay, said secondary windings being so associated on the transformer that changes in the arc current reacts through its winding to the winding connected to the rectifier elements to produce a voltage change therein sufficient to operate said relay for the purpose described.

5. Means for utilizing alternating current at the arc of a projecting lamp but controlling the arc by direct current, said means including a transformer having considerable reactance, a secondary winding on the transformer for supplying current to the arc, a rectifier, other secondary windings on the transformer connected to the rectifier, a relay having an operating winding connected to the DC output circuit of the rectifier, and a motor, for regulating the arc gap, controlled by said relay, the secondary windings being so associated that the changes in the winding furnishing the arc current will induce changes in the other secondary winding, so as to operate said relay for the purpose described.

6. Means for utilizing alternating current at the arc of a projecting lamp but controlling the arc by direct current, said means including a transformer having a core with primary and secondary windings thereon, a secondary winding being connected to supply current to the arc electrodes, an impedance in said arc circuit, a rectifier, an auxiliary transformer having a primary connected across said impedance and a secondary connected to elements of said rectifier, a relay in the rectifier circuit and a motor, for relatively moving said arc electrodes, controlled by said relay.

7. Means for utilizing alternating current at the arc of a projecting lamp but controlling the arc by direct current, said means including a transformer having a core with primary and secondary windings thereon, a secondary winding being connected to supply current to the arc electrodes, a rectifier, an auxiliary transformer having a winding in the arc circuit and another winding connected to elements of said rectifier, a relay in the rectifier circuit and a motor, for relatively moving said arc electrodes, controlled by said relay.

8. Means for utilizing alternating current at the arc of a projecting lamp but controlling the arc by direct current, said means including a transformer having a core with windings thereon, one of which supplies current to said arc electrodes, a rectifier, a winding on said transformer for controlling the action of said rectifier, a transformer winding delivering current to the rectifying elements of the rectifier, means for causing the arc current to act on this last-mentioned winding, a relay in the rectified current circuit and a direct-current motor, for relatively moving the arc electrodes, controlled by said relay as the arc current varies.

9. Means for utilizing alternating current at the arc of a projecting lamp but controlling the arc by direct current, said means including a transformer having a core and windings thereon, one of said windings being connected to the arc electrodes, a DC relay, a DC motor for relatively moving the arc electrodes and controlled by said relay, a rectifier and an associated winding for supplying rectified current to said relay and motor, means for exciting said last-mentioned winding, and means for coupling this winding to the arc circuit so said relay will respond to changes in the arc current.

10. The method of operating an arc, which consists in applying to the motor-actuated arc electrodes, alternating current through a circuit having impedance therein, rectifying alternating current in another circuit which includes the winding of a direct current relay, coupling said two circuits together so the variations in the arc circuit will produce changes in the relay winding circuit to operate the relay according to the arc condition, and causing said relay to control the operation of said motor.

JAMES KNOX ELDERKIN.